Dec. 18, 1928.  
J. A. KNOWLTON  
1,695,733  
SYSTEM FOR DEVELOPING POWER FROM TIDES  
Original Filed Feb. 25, 1926  4 Sheets-Sheet 2

Inventor:  
John A. Knowlton,  
by Walter E. Lombard,  
Atty.

Dec. 18, 1928.  1,695,733
J. A. KNOWLTON
SYSTEM FOR DEVELOPING POWER FROM TIDES
Original Filed Feb. 25, 1926   4 Sheets-Sheet 4

Inventor:
John A. Knowlton,
by Walter E. Lombard.
Atty.

Patented Dec. 18, 1928.

1,695,733

UNITED STATES PATENT OFFICE.

JOHN A. KNOWLTON, OF DORCHESTER, MASSACHUSETTS, ASSIGNOR TO SAID KNOWLTON, TRUSTEE FOR UNIVERSAL TIDE POWER CO., OF BOSTON, MASSACHUSETTS.

SYSTEM FOR DEVELOPING POWER FROM TIDES.

Application filed February 25, 1926, Serial No. 90,557. Renewed May 17, 1928.

This invention relates to systems for developing power from the tides, the object being the production of apparatus in which pistons are mounted in a pair of wells and alternately raised at one speed and lowered at a greater speed, said pistons being adapted in their movement to actuate mechanisms for converting the reciprocatory motion thereof into rotary motion.

This object is attained by the mechanism illustrated in the accompanying drawings.

For the purpose of illustrating the invention, one preferred form thereof is illustrated in the drawings, this form having been found to give satisfactory and reliable results, although it is to be understood that the various instrumentalities of which the invention consists can be variously arranged and organized, and the invention is not limited to the precise arrangement and organization of these instrumentalities as herein shown and described except as required by the scope of the appended claims.

Of the drawings.

Similar characters indicate like parts throughout the several figures of the drawings.

Figure 1:
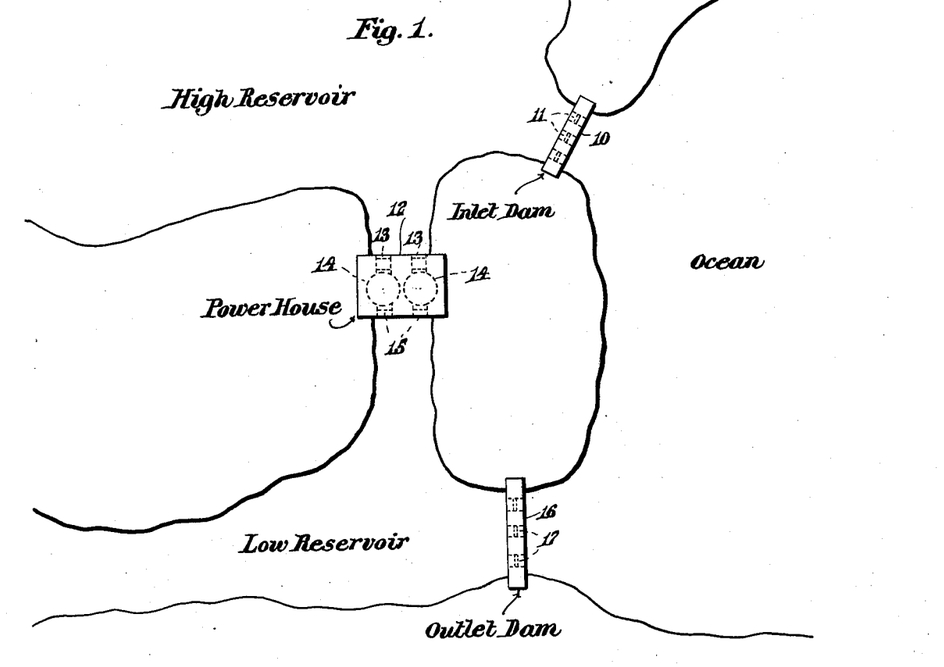
Figure 1 represents a plan of a sample installation of system for developing power from tides embodying the principles of the present invention.

In the drawings, 10 is a dam provided with a plurality of gates 11 which admit water from the ocean into a high reservoir, as shown in Fig. 1 of the drawings and indicated in other views as H. R.

The gates 11 are pivoted at the top and adapted to swing inwardly to admit water into the high reservoir and prevent the return thereof.

Between the high reservoir H. R. and the low reservoir is a coffer dam 12 having inlet passages 13 therein communicating with a pair of wells 14 from which outlet passages 15 communicate with the low reservoir, shown in part in Fig. 1 and in other views indicated as L. R.

Between the low reservoir L. R. and the ocean O (shown only in Figs. 1, 2 and 3) is another dam 16 having a plurality of passages therethrough in which are gates which are pivoted at the top and swing outwardly to permit water in the low reservoir to pass outwardly into the ocean O at low tide, these gates being restrained from inward movement, thereby preventing the water from the ocean O entering the low reservoir.

Each inlet 13 communicates with a chamber 18 from which a passage 19 extends into a well 14.

Oppositely disposed to the inlet 19 is an outlet passage 20 communicating with a chamber 21 from which the passage 15 extends to the low reservoir L. R.

The coffer dam is made of concrete and set into this concrete on the inner end of the passage 13 is a gate 22 having a plurality of shutters 23 pivotally mounted therein.

The shutters 23 of each gate 22 are articulated to a rod 24 extending upwardly above the top of the coffer dam 12 with its upper end secured to a lever 25 pivoted at 26 to posts 27, the opposite end of said lever being interposed between other posts 28 through which extends a locking pin 29.

This locking pin also extends through a hole in the lever 25.

Figures 6, 8, 9:
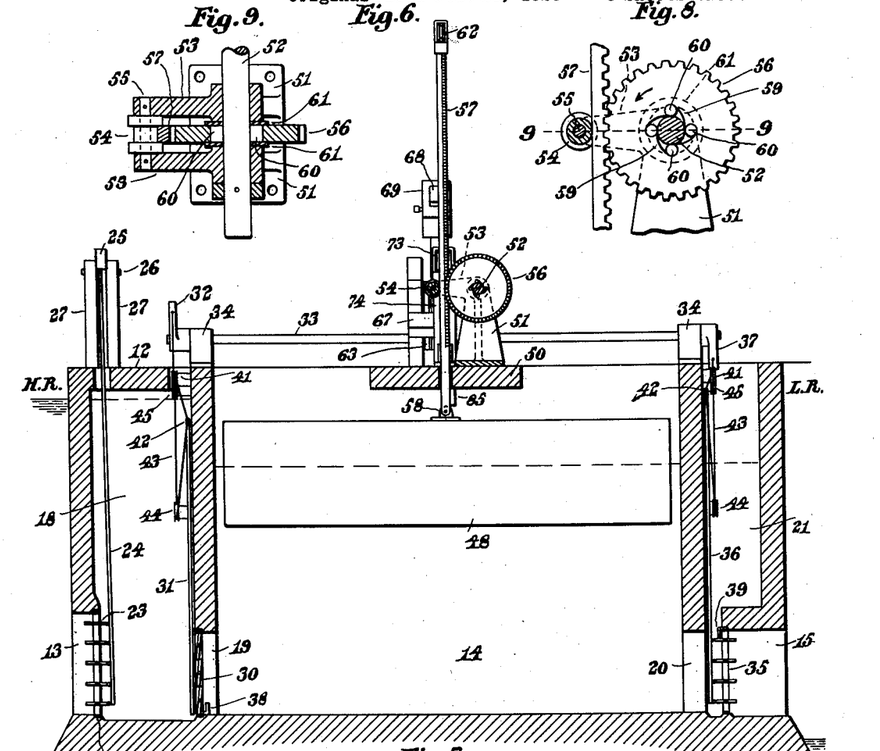
Figure 6 represents a transverse vertical section of same on line 6, 6 on Fig. 4.
Figure 8 represents a detail in section showing the rack and gear for driving the main shaft.
Figure 9 represents a section of same on line 9, 9 on Fig. 8.

This gate 22 is an emergency gate and is normally closed but may be opened to place the apparatus in commission by manipulating the lever 25, thereby moving the shutters into the position indicated in Fig. 6 of the drawings, and locking the lever 25 in this position by means of the pin 29.

When the gate 22 has been opened the water in the chamber 18 will be at the same level as that in the high reservoir H. R.

A similar gate 30 is disposed in the inlet 19, the shutters of which are articulated to a rod 31 which may be raised and lowered by an arm 32 on an oscillating shaft 33 mounted in bearings 34 at the top of the coffer dam 12.

The connection between the rod 31 and the arm 32 is of a peculiar construction and will be hereinafter described.

In the gate 22 there are five shutters and in the gate 30 only three shutters, the inlet 19 being smaller than the inlet passage 13.

By this means there is always an ample supply of water for the inflow into each well 14.

In the outlet passage 13 is a similar gate 35, the shutters of which are articulated to a rod 36 which is adapted to be raised and lowered by means of an arm 37 on the oscillating shaft 33.

In this gate 35 are four shutters or a greater number than are contained in gate 30, this easily taking care of all the water admitted to well 14 through the inlet 19.

In the passage 19 is a stop member 38 which limits the movement of the shutters of gate 30 when the rod 31 is raised, so that the shutters can never be moved beyond a horizontal position.

The water is discharged from each well 14 more rapidly than it is admitted owing to the greater capacity of the outlet gate 35 over the inlet gate 30.

In the passage 15 is a similar stop member 39 which prevents the shutters of gate 35 from moving beyond a horizontal position when the rod 36 is raised.

The weight of the rods 31 and 36 articulated to the shutters of gates 30, 35 tends to move the shutters of these gates into closed position, thereby permitting the pressure of the inflowing water to retain the shutters in this closed position.

From the outer end of the arm 32 extend cables 40 over sheaves 41 in each chamber 18, the opposite ends of these cables being secured at 42 to the upper ends of the gate actuating rods 31.

Another cable 43 extends from the top of each gate actuating rod 31 downwardly under a sheave 44 in the chamber 18 and upwardly over a sheave 45 in a depression 46 in the upper part of the coffer dam.

Each cable 43 passes around a sheave 47 pivotally mounted upon the bearing 34 and is connected to the outer end of the arm 32.

Figure 7:
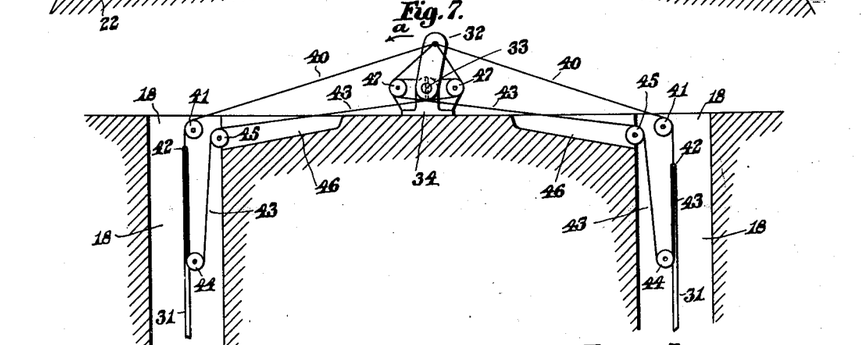
Figure 7 represents a vertical section showing the means for actuating the inlet gates.

When the arm 32 is moved in the direction of the arrow $a$ on Fig. 7, it is obvious that the cable 40 on the right side of said figure will raise the gate actuating rod 31 connected thereto.

The same movement of the arm 32 will cause the gate actuating rod on the left of said figure to be drawn downwardly by means of the cable 43.

When the arm 32 moves from its left hand position toward the right to the position indicated in Fig. 7, the rod 31 at the left of Fig. 7 will be raised and the rod at the right of said figure will be lowered.

It will be noted, therefore, that during every oscillation of the shaft 33 and arm 32 secured thereto, the inlet gates 22 will be positivly opened and closed as desired.

Figure 5:
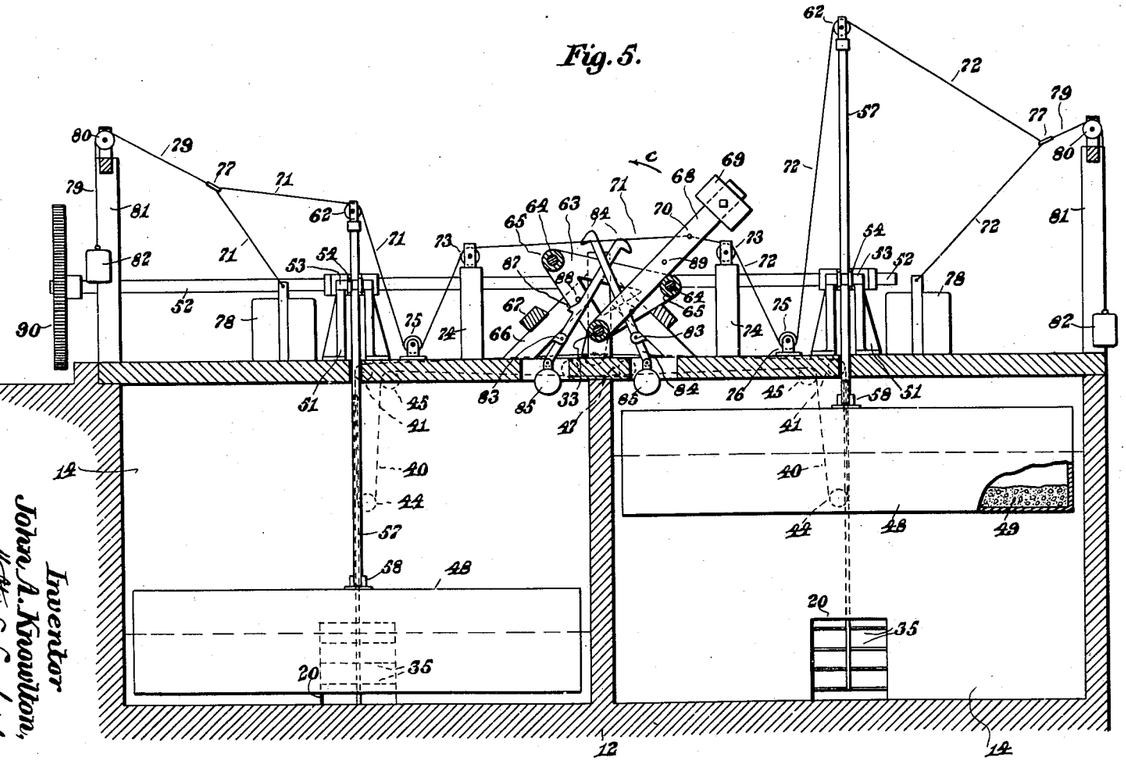
Figure 5 represents a vertical longitudinal section of the same on line 5, 5 on Fig. 4.

Similar mechanism is provided for positively opening and closing the outlet gates by the oscillation of the arm 37 on the oscillating shaft 33 as indicated in dotted lines in Fig. 5 of the drawings.

In each well 14 is a piston 48 which is hollow and contains a quantity of concrete 49 to weight the same so that the greater portion of the piston 48 will be submerged in the water contained within the well 14.

On the platform 50 above each well 14 are mounted two supports 51 having bearings at the upper end thereof for a rotary driving shaft 52, each of these supports having lateral extensions 53 between which is a flanged roller 54 freely revoluble upon a pin 55 secured in said arms 53.

Between the supports 51 is a gear 56, the teeth of which mesh with a rack member 57, the lower end of which extends through the platform 50 and is pivotally connected at 58 to a piston 48.

Each gear 56 has a plurality of depressions 59 formed in its inner wall surrounding the shaft 52, each of these depressions 59 containing a roller 60.

Each depression 59 has an inclined wall so designed that when the rack 57 moves downwardly causing the gear 56 to move in direction of the arrow $b$ in Fig. 8 of the drawings, the rollers 60 will be forced by said inclined wall against the shaft 52, impinging on the same so as to cause rotation thereof.

When the rack 57 moves upwardly the rollers will return to the widest part of the depressions 59 and permit the gear 56 to move freely about the shaft 52 without imparting movement thereto.

The flanged roller 54 bears against the outer edge of the rack 57 and retains it in mesh with the gear 56 during its upward and downward movements, the flanges on the roller preventing any lateral play of the rack 57 during its movement.

The depressions 59 and rollers 60 are covered on opposite faces of the gears 56 by means of disks 61.

It will be obvious, therefore, that whenever a piston 48 is raised by the water flowing into the well 14 no movement will be imparted to the shaft 52 by means of the rack 57 and gear 56, but whenever the piston 48 moves downwardly rotary movement will be imparted to this shaft.

As the pistons 48 work in pairs and one piston is moving downwardly while the other is moving upwardly it is obvious that continuous rotary movement will be imparted to the shaft 52.

While for convenience only a single pair of wells are shown and described, it is obvious that any number of such pairs may be used, all connected in the same manner to the same driving shaft 52.

At the top of each rack member 57 is pivoted a sheave 62.

On the oscillating shaft 33 are keyed two triangular plates 63 connected by pins 44 on which are mounted rollers 65, the lower end of said plates 63 being keyed upon the oscillating shaft 33.

The plates 63 are adapted to tilt about the axis of the shaft 33 and impart oscillatory movement thereto.

Outside of the tilting plates 63 and extending upwardly from the platform 50 is a framework 66 having cross bars 67 thereon which limit the tilting movement of said plates 63.

Loosely mounted upon the shaft 33 is a lever 68 having a weight 69 adjustably mounted on its outer end.

This lever 68 has a pin 70 extending laterally therefrom, and to this pin 70 is connected cables 71 and 72 extending in opposite directions therefrom.

These cables 71 and 72 pass over sheaves 73 mounted upon posts 74 extending upwardly from the platform 50, under sheaves 75 revoluble in standards 76 secured to said platform, then upwardly over the sheaves 62 at the upper ends of the rack members 57, and finally downwardly through rings 77 to weights 78 normally resting upon the platform 50.

These rings 77 are secured to the ends of cords 79 passing over sheaves 80 at the upper end of posts 81 on the opposite ends of the platform 50, said cords 79 having secured to their opposite ends small weights 82.

The purpose of the weights 82 is to keep the cables 71 and 72 taut at all times during the movements thereof, due to the rise and fall of the rack member 57.

Referring to Fig. 5 of the drawings it is obvious that when the piston 48 at left of said figure commences to rise in its well the sheave 62 on the upper end of the rack member 57 will move upwardly and cause a pull upon the cable 71 which will effect a movement of the lever 68 in the direction of the arrow c on Fig. 5 of the drawings.

Pivoted to the framework 66 at 83 are locking bars 84 having weights 85 at their lower ends and each of which has a lateral projection 87 adapted to coact with a pin 88 extending laterally from one of the tilting plates 63 to lock said tilting plates 63 at the extreme of their movement in either direction.

As shown in Fig. 5, the tilting plates 63 are shown tipped down towards the right of said figure and locked in this position.

They cannot move from this position until the locking bar 84 in commission is moved sufficiently to release the projection 87 from the pin 88.

This releasing is accomplished by means of the pin 89 extending laterally from the lever 68.

When the lever 68 moves in the direction of the arrow c on Fig. 5, the pin 89 will pass over the end of one locking bar 84 then out of commission and come into contact with the other bar 84 which is in locking position.

As soon as the pin 89 comes into contact with this bar 84 the continued movement of the lever 68 will move the bar 84 about its pivot 83, thereby unlocking the tilting plates 63.

By this time the lever 68 has reached a vertical position and as soon as it moves downwardly from this vertical position, being loosely mounted upon the shaft 33 and having a heavy weight 69 on its outer end, it will move very rapidly into contact with the roller 65 on the left of the tilting member 63 and effect a very rapid oscillation of the tilting member 63 and shaft 33 until the under edges of the plates 63 come in contact with the cross bar 67.

This rapid oscillation of the arms 32 and 37 will effect a very quick opening and closing of the shutters of the inlet gate 30 and outlet gate 35.

As a consequence of this quick action as soon as a piston 48 reaches its lowest position in a well 14 the inlet gate 30 thereto will be immediately opened to admit an inflow of water which will again raise it.

As soon as the piston reaches its uppermost limit, the quick action of the arms 32, 37 will immediately open the outlet gates 35 and permit the discharge of water from the well so that the piston may be lowered again.

The result is that the reciprocatory movement of the pistons 48 is continuous with no lost motion at the end of the movements in opposite directions.

This means for attaining this result forms a most important feature of the invention, as obviously it is essential that the shaft 52 should have a continuous rotation in order to effect any beneficial result.

To the end of the shaft 52 is secured a gear 90 meshing with a pinion 91 on a shaft 92 having a fly wheel 93 at one end and a pulley 94 at the other end.

By means of a belt 95 the generator 96 is driven from the pulley 94.

When the tilting plates 63 are moved to the left of Fig. 5 the left hand bar 84 will be in commission and lock the plates 63 in this position until released by the return movement of the weighted lever 68.

Figure 2:
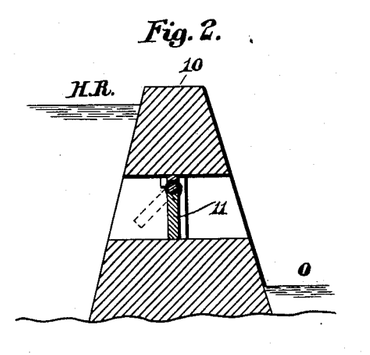
Figure 2 represents a vertical section through the inlet dam thereof.
Figure 3:
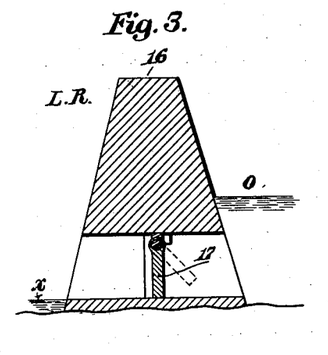
Figure 3 represents a vertical section through the outlet dam.
Figure 4:
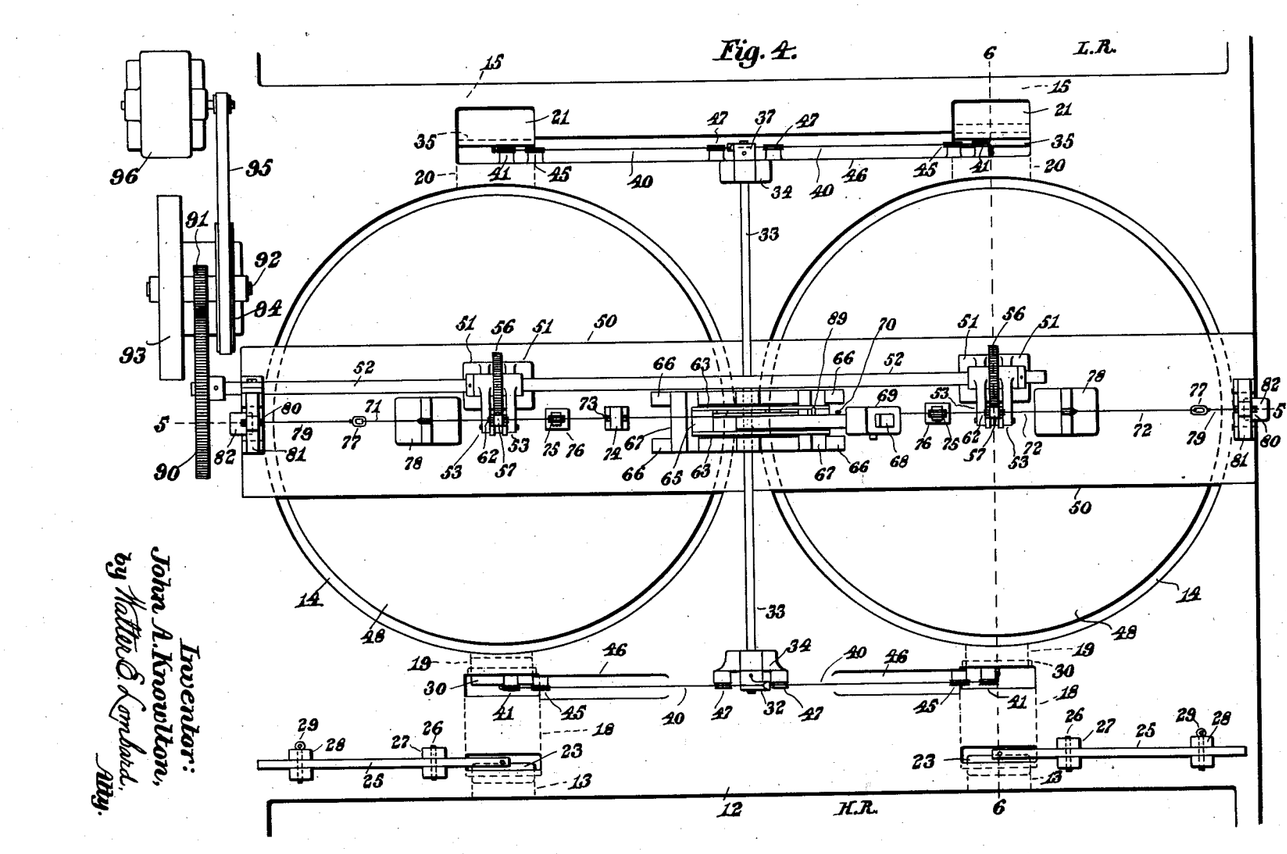
Figure 4 represents a plan of the apparatus within the power house by which rotary motion is derived from the rise and fall of tide water in the wells contained in said power house.

The gates 11 in the dam 10 are preferably located in the dam 10 at a point substantially midway of high and low tide as indicated in Fig. 2, while the gates 17 in dam 16 are preferably located where low tide $x$ would be as indicated in Fig. 3.

Both Figs. 2 and 3 are diagrammatic and are drawn without regard to actual dimensions and without regard to the actual construction of the gates themselves, for the structure of the gates forms no part of the present invention.

The high reservoir H. R. is preferably located at the mouth of a river so that a high level may be attained at all times, not only due to the inflow of water from the ocean O when the tide is high, but also on account of the downward flow of water in the river.

As a consequence the level in the high reservoir H. R. is always higher than the level of the water in the low reservoir L. R. and as a result there is always a great pressure therein which will permit the rush of water therefrom through the wells 14 into the low reservoir L. R. when the various gates are opened.

As previously stated the emergency gates 22 are closed when the plant is not in use and these gates as well as the gates 30, 35 are located at such a low level that they are operable even when the surfaces of the two reservoirs are frozen.

As previously described only one inlet gate 30 is open at a time and when the inlet gate 30 for one well is open the outlet gate 35 of the other well is open and vice versa.

This results in the pistons 48 always reciprocating in opposite directions and when each piston reaches its highest level it actuates a tripping mechanism controlling various devices which permits the immediate lowering of said gates and the lifting of the piston in the companion well.

While wells of a certain depth are shown in the drawings it is perfectly obvious that wells of greater depth may be used, thereby giving a greater reciprocation of the pistons 48 and when this is done the power derived from the fall of each weighted piston is vastly increased.

When the lever 68 moving in the direction of arrow $c$ on Fig. 5 makes a quick drop to its extreme left position there would be a slackness of the cable 71 if it were not for the weight 82, but all tendency for the cable 71 to become slack is taken care of by the lowering of the weight 82 and the pulling upon the cord 79 and this is also true of cable 72 when the weighted lever is moving in the opposite direction.

The weights 78 simply serve as an anchor for the outer ends of the cables 71, 72, but if by contraction or any other reason these cables become shortened the weight 78 will be lifted slightly from the platform 50 and when the tripping mechanisms have acted, said weights will return to their normal positions on the platform.

This makes a very simple but effective system for developing power from the tides, the power produced being limited in amount only by the quantity of water made to serve and unlimited quantities of such water is always available from the regular and unfailing action of the tides.

By means of the high and low reservoirs equipped with gates or ports for admitting and discharging tidal water, it is evident that a tidal head may be detained and a tidal discharge so expedited that measurable and dependable power may be obtained through the heads created by differences of level in the water during every hour of each day.

It is believed that from the foregoing explanation the operation and many advantages of the invention will be fully understood.

Having thus described my invention, I claim—

1. A system for utilizing the power of tides consisting of a pair of wells adapted to receive water from a high reservoir and subsequently discharge it into a low reservoir, an inlet gate to each well, an outlet gate from each well, means for simultaneously opening the inlet gate of one well and the outlet gate of the other well and subsequently closing said gates and opening the other gates, pistons in said wells adapted to operate independently of each other, and power creating mechanism actuated by said pistons only during the lowering thereof 2. A system for utilizing the power of tides consisting of a pair of wells adapted to receive water from a high reservoir and subsequently discharge it into a low reservoir, an inlet gate to each well, an outlet gate from each well, means for simultaneously opening the inlet gate of one well and the outlet gate of the other well and subsequently closing said gates and opening the other gates, pistons in said wells adapted to operate independently of each other, power creating mechanism actuated by said pistons only during the lowering thereof, a chamber between the inlet gates and the high reservior, and a gate controlling the admission of water to said chamber from said reservoir.

3. A system for utilizing the power of tides consisting of a pair of wells adapted to receive water from a high reservoir and subsequently discharge it into a low reservoir, an inlet gate to each well, an outlet gate from each well, means for simultaneously opening the inlet gate of one well and the outlet gate of the other well and subsequently closing said gates and opening the other gates, pistons in said wells operable independently of each other, power creating mechanism actuated by said pistons only during the lowering thereof, a chamber between the inlet gates and the high reservoir, a gate having pivoted shutters for controlling the admission of water to said chamber from said reservoir, and means above said chamber for actuating said shutters.

4. A system for utilizing the power of tides consisting of a pair of wells adapted to receive water from a high reservoir and subsequently discharge it into a low reservoir, an inlet gate to each well provided with pivoted shutters, means on the high reservoir side of said gate for actuating said shutters, an outlet gate from each well, means for simultaneously opening the inlet gate of one well and the outlet gate of the other well and subsequently closing said gates and opening the other gates, pistons in said wells operable independently of each other, and power creating mechanism actuated by said pistons only during the lowering thereof.

5. A system for utilizing the power of tides consisting of a pair of wells adapted to receive water from a high reservoir and subsequently discharge it into a low reservoir, an inlet gate to each well, an outlet gate from each well provided with pivoted shutters, means on the high reservoir side of the outlet gate for actuating said shutters, means for simultaneously opening the inlet gate of one well and the outlet gate of the other well and subsequently closing said gates and opening the other gates, pistons in said wells operable independently of each other, and power creating mechanism actuated during the lowering thereof.

6. A system for utilizing the power of tides consisting of a pair of wells adapted to alternately receive water from a high reservoir and discharge it subsequently into a low reservoir at a greater speed than it is admitted, hollow piston members mostly submerged in the water in said wells, a bar secured to each piston and provided with rack teeth, a driving shaft, a gear thereon with its teeth meshing with the rack teeth, and means on each gear for making a driving connection with the shaft only during the downward movement of the rack.

7. A system for utilizing the power of tides consisting of a pair of wells adapted to alternately receive water from a high reservoir and discharge it subsequently into a low reservoir at a greater speed than it is admitted, hollow piston members submerged in the water in said wells, a heavy weight contained within each piston, a bar secured to each piston and provided with rack teeth, a driving shaft, a gear thereon with its teeth meshing with the rack teeth, and means on each gear for making a driving connection directly with the shaft only during the downward movement of the rack.

8. A system for utilizing the power of tides consisting of a pair of wells adapted to alternately receive water from a higher reservoir and discharge it subsequently into a low reservoir at a greater speed than it is admitted, hollow weighted piston members in said wells, members extending upwardly therefrom, an oscillating shaft interposed between the wells perpendicular to a line between the centers thereof, an arm thereon, inlet gates to said wells, controlling mechanism for both of said gates actuated by the oscillation of said arm, and mechanism interposed between said oscillating shaft and said upwardly extending members for causing an oscillation of said shaft at each upward movement of a piston.

9. A system for utilizing the power of tides consisting of a pair of wells adapted to alternately receive water from a high reservoir and discharge it subsequently into a low reservoir at a greater speed than it is admitted, hollow weighted piston members in said wells, members extending upwardly therefrom, an oscillating shaft interposed between the wells perpendicular to a line between the centers thereof, an arm thereon, outlet gates to said wells, controlling mechanism for both of said gates actuated by the oscillation of said arm, mechanism interposed between said oscillating shaft and said upwardly extending members for causing an oscillation of said shaft at each upward movement of a piston, and means for positively closing said gates.

10. A system for utilizing the power of tides consisting of a pair of wells adapted to alternately receive water from a high reservoir and discharge it subsequently into a low reservoir at a greater speed than it is admitted, hollow weighted piston members in said wells, members extending upwardly therefrom, an oscillating shaft interposed between the wells perpendicular to a line between the centers thereof, an arm thereon, outlet gates to said wells, controlling mechanism for both of said gates actuated by the oscillation of said arm, mechanism interposed between said oscillating shaft and said upwardly extending members for causing an oscillation of said shaft only at each upward movement of a piston, and separate means for positively closing said gates placed in commission by the oscillation of said shaft.

11. A system for utilizing the power of tides consisting of a pair of wells adapted to receive water from a high reservoir at one side thereof and subsequently discharge it into a low reservoir at the other side thereof at a greater speed than it is admitted, an inlet gate to each well, an outlet gate from each well, means for simultaneously opening the inlet gate of one well and the outlet gate of the other well and subsequently closing said gates and opening the other gates, pistons in said wells, adapted to be alternately raised by the water in said wells independently of each other, and power creating mechanism actuated by said pistons only during the lowering thereof.

12. A system for utilizing the power of tides consisting of a pair of wells, adapted to receive water from a high reservoir, and subsequently discharge it into a low reservoir at a greater speed than it is admitted, means for alternately filling said wells with water and subsequently discharging said water, pistons in said wells, a rack extending upwardly from each piston, a rotary shaft, a gear thereon meshing with each rack, and means interposed between each gear and said shaft adapted to impinge upon and rotate said shaft only during the lowering of the pistons.

13. A system for utilizing the power of tides consisting of a pair of wells, adapted to receive water from a high reservoir and subsequently discharge it into a low reservoir, means for alternately filling said wells with water from the high reservoir and subsequently discharging said water into the low reservoir, a rigid member extending upwardly from each piston and provided with rack teeth, a rotary shaft, a gear thereon meshing with the teeth of each rack member and having depressions with inclined walls on its inner cylindrical wall, means for retaining in mesh the teeth of said rack and gear, and rollers in said depressions adapted to impinge upon said shaft only during the lowering of said pistons.

14. A system for utilizing the power of tides consisting of a pair of wells, adapted to receive water from a high reservoir and subsequently discharge it into a low reservoir, means for alternately filling said wells with water from the high reservoir and subsequently discharging said water into the low reservoir, a rack extending upwardly from each piston, a rotary shaft, a gear thereon meshing with each rack and provided with means for locking it to the shaft only during the lowering of the pistons, an oscillating shaft, a tilting member on said oscillating shaft, gates controlling the admission and discharge of water to and from said wells, means on said oscillating shaft for actuating said gates, and means for actuating said tilting member by the rise and fall of said pistons.

15. A system for utilizing the power of tides consisting of a pair of wells, adapted to receive water from a high reservoir and subsequently discharge it into a low reservoir, an inlet gate to each well having a plurality of pivoted shutters, an outlet gate from each well provided with a greater number of pivoted shutters than the inlet gate, means on the high reservoir side of the gate for actuating said shutters, means for simultaneously opening the inlet gate of one well and the outlet gate of the other well and subsequently closing said gates and opening the other gates, pistons in said wells operable independently of each other, and power creating mechanism actuated by said pistons only during the lowering thereof.

16. A system for utilizing the power of tides consisting of a pair of wells adapted to alternately receive water from a high reservoir and discharge it subsequently into a low reservoir, gates controlling the flow of water into and from said wells, hollow piston members in said wells and mostly submerged in said water, a rack secured to each piston, a driving shaft, a gear thereon meshing with each rack, means on each gear for making a driving connection with the shaft only during the downward movement of the rack, an oscillating shaft at right angles to the driving shaft, means thereon for actuating said gates, a tilting member secured to the oscillating shaft, a weighted lever loosely mounted on said oscillating shaft and adapted to be moved about the axis of the oscillating shaft into contact with shoulders on the tilting member to effect a tilting thereof, and means coacting with said pistons for effecting a swinging movement to said lever.

17. A system for utilizing the power of tides consisting of a pair of wells adapted to alternately receive water from a high reservoir and discharge it subsequently into a low reservoir, gates controlling the flow of water into and from said wells, hollow piston members in said wells and mostly submerged in said water, a heavy weight contained within each piston, a rack secured to each piston, a driving shaft, a gear thereon meshing with each rack, means on each gear for making a driving connection with the shaft only during the downward movement of the rack, an oscillating shaft, means thereon for actuating said gates, a tilting member secured to and movable with said oscillating shaft and having oppositely disposed laterally extending bars, a weighted lever loosely mounted on said oscillating shaft and adapted to be moved against a laterally extending bar and tilt said tilting member thereby causing an oscillation of the oscillating shaft, and means operable by the rise and fall of said piston for moving said lever about the axis of the oscillating shaft.

18. A system for utilizing the power of tides consisting of a pair of wells adapted to alternately receive water from a high reservoir and discharge it subsequently into a low reservoir, hollow weighted piston members in said wells, members extending upwardly therefrom, an oscillating shaft, an arm thereon, inlet gates to said wells, controlling mechanism for said gates actuated by the oscillation of said arm, a tilting member secured to said oscillating shaft provided with oppositely disposed laterally extending bars, a weighted lever loosely mounted on said oscillating shaft and adapted to be moved against a laterally extending bar to tilt the tilting member and oscillate the oscillating shaft, means for limiting the movement of said tilting member, and means actuated by the rise and fall of said pistons for moving said lever about the axis of said oscillating shaft.

19. A system for utilizing the power of tides consisting of a pair of wells adapted to alternately receive water from a high reservoir and discharge it subsequently into a low reservoir, hollow weighted piston members in said wells, members extending upwardly therefrom, an oscillating shaft, an arm thereon, inlet gates to said wells, controlling mechanism for said gates actuated by the oscillation of said arm, a tilting member secured to said oscillating shaft provided with oppositely disposed laterally extending bars, a weighted lever loosely mounted on said oscillating shaft and adapted to be moved against a laterally extending bar to tilt the tilting member and oscillate the oscillating shaft, means for limiting the movement of said member, means actuated by the rise and fall of said pistons for moving said lever about the axis of said oscillating shaft, and means for locking said tilting member at the end of its movement in either direction.

20. A system for utilizing the power of tides consisting of a pair of wells adapted to alternately receive water from a high reservoir and discharge it subsequently into a low reservoir, hollow weighted piston members in said wells, members extending upwardly therefrom, an oscillating shaft, an arm thereon, inlet gates to said wells, controlling mechanism for said gates actuated by the oscillation of said arm, a tilting member secured to said oscillating shaft provided with oppositely disposed laterally extending bars, a weighted lever loosely mounted on said oscillating shaft and adapted to be moved against a laterally extending bar to tilt the tilting member and oscillate the oscillating shaft, means for limiting the movement of said tilting member, means actuated by the rise and fall of said pistons for moving said lever about the axis of said oscillating shaft, means for locking said tilting member at the end of its movement in either direction, and means on said lever for releasing said locking means when said lever has reached a vertical position during its movement.

21. A system for utilizing the power of tides consisting of a pair of wells adapted to alternately receive water from a high reservoir and discharge it subsequently into a low reservoir, hollow weighted piston members in said wells, members extending upwardly therefrom, an oscillating shaft, an arm thereon, gates controlling the flow of water into and from said wells, controlling mechanism for said gates actuated by the oscillation of said arm, mechanism interposed between said oscillating shaft and said upwardly extending members for causing an oscillation of said shaft at each upward movement of a piston and comprising in part a tilting member secured to the oscillating shaft, and a swinging weighted lever connected by cables to said upwardly extending members and adapted to impart movement to said tilting member during its movement in either direction.

22. A system for utilizing the power of tides consisting of a pair of wells adapted to alternately receive water from a high reservoir and discharge it subsequently into a low reservoir, hollow weighted piston members in said wells, members extending upwardly therefrom, an oscillating shaft, an arm thereon, gates controlling the flow of water into and from said wells, controlling mechanism for said gates actuated by the oscillation of said arm, mechanism interposed between said oscillating shaft and said upwardly extending members for causing an oscillation of said shaft at each upward movement of a piston and comprising in part a tilting member secured to the oscillating shaft, a swinging weighted lever connected by cables to said upwardly extending members and adapted to impart movement to said tilting member during its movement in either direction, and means preventing movement of said tilting member during the first half of the movement of said lever 23. A system for utilizing the power of tides consisting of a pair of wells adapted to alternately receive water from a high reservoir and discharge it subsequently into a low reservoir, hollow weighted piston members in said wells, members extending upwardly therefrom, an oscillating shaft, an arm thereon, gates controlling the flow of water into and from said wells, controlling mechanism for said gates actuated by the oscillation of said arm, a tilting member secured to said oscillating shaft, a weighted lever loosely mounted on said oscillating shaft and adapted to tilt said tilting member during the last half of its movement, means controlled by the rise and fall of said pistons for moving said weighted lever, pins projecting from said tilting member, and locking devices coacting with said pins to retain said tilting members at the extreme of its movement and adapted to be released by the movement of said pivoted lever.

24. A system for utilizing the power of tides consisting of a pair of wells adapted to alternately receive water from a high reservoir and discharge it subsequently into a low reservoir, hollow weighted piston members in said wells, members extending upwardly therefrom, an oscillating shaft, an arm thereon, gates controlling the flow of water into and from said wells, controlling mechanism for said gates actuated by the oscillation of said arm, a tilting member secured to said oscillating shaft, a weighted lever loosely mounted on said oscillating shaft and adapted to tilt said tilting member during the last half of its movement, means controlled by the rise and fall of said pistons for moving said weighted lever, pins projecting from said tilting member, and weighted locking devices coacting with said pins to retain said tilting member at the extreme of its movement and adapted to be released by the movement of said pivoted lever.

25. In a system for developing power from the tide, a pair of wells, a piston in each well, means for admitting water alternately to said wells, gates for controlling the admission of water into said wells, an oscillating shaft interposed between said wells perpendicular to a line between the centers thereof, an arm thereon, cables connected to said arm and to both inlet gates, and independent means coacting therewith actuated by the rise and fall of the pistons for oscillating said arm and causing the simultaneous opening of one inlet gate and the closing of the other.

26. In a system for developing power from the tides, a pair of wells, a piston in each well, means for admitting water alternately to said well, a set of gates for controlling the admission of water into said wells and another set controlling its discharge therefrom, an oscillating shaft, an arm secured thereto and movable therewith, means connected to said arm and either set of gates whereby one gate of each set may be raised by the movement of said arm and the other gate closed, a tilting member secured to said oscillating shaft, a weighted lever loosely mounted on said shaft and adapted to be moved into contact with said member and tilt it, a cable extending from said lever in opposite directions, a member extending upwardly from each piston, a sheave at the upper end thereof over which each cable extends, and a weight at the outer end of said cable.

27. In a system for developing power from the tides, a pair of wells, a piston in each well, means for admitting water alternately to said well, a set of gates for controlling the admission of water into said wells and another set controlling its discharge therefrom, an oscillating shaft, an arm secured thereto and movable therewith, means connected to said arm and either set of gates whereby one gate of each set may be raised by the movement of said arm and the other gate closed, a tilting member secured to said oscillating shaft, a weighted lever loosely mounted on said shaft and adapted to be moved into contact with said member and tilt it, cables extending from said lever in opposite directions, a member extending upwardly from each piston, a sheave at the upper end thereof over which each cable extends, a weight at the outer end of said cable, and means keeping taut the portion of cable between said sheave and weight.

28. In a system for developing power from the tides, a pair of wells, a piston in each well, means for admitting water alternately to said well, a set of gates for controlling the admission of water into said wells and another set controlling its discharge therefrom, an oscillating shaft, an arm secured thereto and moveable therewith, means connected to said arm and either set of gates whereby one gate of each set may be raised by the movement of said arm and the other gate closed, a tilting member secured to said oscillating shaft, a weighted lever loosely mounted on said shaft and adapted to be moved into contact with said member and tilt it, cables extending from said lever in opposite directions, a member extending upwardly from each piston, a sheave at the upper end thereof over which each cable extends, a weight at the outer end of said cable, a post, a sheave at the upper end thereof, a cord extending over the sheave on said post; a ring on one end of said cord through which extends the portion of the cable between said weight and the sheave on said upwardly extending member, and a weight on the opposite end of said cord.

29. In a system for developing power from the tides, a pair of wells, a piston in each well, means for admitting water alternately to said well, a set of gates for controlling the admission of water into said wells and another set controlling its discharge therefrom, an oscillating shaft, an arm secured thereto and movable therewith, means connected to said arm and either set of gates whereby one gate of each set may be raised by the movement of said arm and the other gate closed, a tilting member secured to said oscillating shaft, a weighted lever loosely mounted on said shaft and adapted to be moved into contact with said member and tilt it, cables extending from said lever in opposite directions, a member extending upwardly from each piston, a sheave at the upper end thereof over which each cable extends, a weight at the outer end of said cable, a support between said wells provided with means for limiting the movement of the tilting member, locking bars pivoted to said support and provided with lateral projections, pins on said tilting member, weights on said bars retaining them normally against said pins, said lateral projections being so disposed as to engage a pin when the tilting member has been moved to its limit in one direction and retain it in this position, and means on said weighted lever for moving said locking bar about its pivot and disengaging said projection from said pin.

30. A system for utilizing the power of tides consisting of a pair of wells adapted to receive water from a high reservoir and subsequently discharge it into a low reservoir, an inlet gate to each well, an outlet gate from each well having a greater capacity than the inlet gate, a piston in each well adapted to be lifted by the inflow of water and to lower more rapidly than it rises, said pistons being adapted to move independently of each other, and means coacting with said pistons for converting reciprocatory motion into rotary motion.

31. A system for utilizing the power of tides consisting of a pair of wells adapted to receive water from a high reservoir and subsequently discharge it into a low reservoir more rapidly than it is admitted, pistons in said wells adapted to be alternately raised and lowered independently of each other, and means coacting with said pistons for converting reciprocatory motion into rotary motion.

32. A system for utilizing the power of tides consisting of a high reservoir, a low reservoir, means for automatically and continuously admitting water from the ocean to the high reservoir during the rise of the tide from its mean level to its high level and preventing the return of said water, means for automatically discharging the water from the low reservoir into the ocean during the ebb tide, a coffer dam between the high and low reservoirs provided with gates therethrough adapted to be alternately opened, and a single power creating mechanism adjacent said coffer dam adapted to be actuated by the flow of water through the coffer dam when either gate is open.

33. A system for utilizing the power of tides consisting of a high reservoir, a low reservoir, means for automatically and continuously admitting water from the ocean to the high reservoir during the rise of the tide from its mean level to its high level, means for automatically discharging the water from the low reservoir into the ocean during the ebb tide, a coffer dam between the high and low reservoirs containing a plurality of wells and a chamber between said wells and the high reservoir, an emergency gate at the bottom of said coffer dam for admitting water to said chamber, an inlet gate controlling the flow of water from said chamber to the bottom of each well, an outlet gate controlling the flow of water from each well to the low reservoir, a weighted piston in each well adapted to be raised by the rise of water within said well, and power creating mechanism adapted to be actuated by the fall of each piston.

34. A system for utilizing the power of tides consisting of a high reservoir, a low reservoir adjacent thereto and at one side thereof, means for automatically and continuously admitting water from the ocean to the high reservoir during the rise of the tide above its mean level and preventing the return thereof, means for automatically discharging the water from the low reservoir into the ocean during the ebb tide and preventing the return thereof, a coffer dam between the high and low reservoirs containing a plurality of wells and a chamber between said wells and the high reservoir, an emergency gate noramlly closed but adapted to be opened to admit water to said chamber when the system is in operation, an inlet gate controlling the flow of water from said chamber to the bottom of each well, an outlet gate controlling the flow of water from each well to the low reservoir, and power creating mechanism actuated by the rise and fall of water within said wells including pistons in said wells adapted to operate alternately.

35. A system for utilizing the power of tides consisting of a main body of tidal water, a high reservoir, a dam between said main body of water and the high reservoir, gates in said dam below the top thereof adapted to open into said reservoir and continuously admit water thereto from the main body when the tide is above its mean level and prevent the return thereof, a low reservoir, a dam between the main body of water and the low reservoir, gates in the latter dam opening into said main body of water to discharge water from the low reservoir and prevent the return thereof, a coffer dam between the high and low reservoirs provided with a passage therethrough, a gate for said passage, and a plurality of power creating mechanisms adjacent said coffer dam adapted to be actuated alternately by the flow of water through the coffer dam when the gate is open.

36. A system for utilizing the power of tides consisting of a high reservoir, a low reservoir adjacent thereto and at one side thereof, a dam between the high reservoir and the ocean having passages therethrough the bottoms of which are at the mean tide level, gates hinged to the tops of said passages and adapted to swing toward said high reservoir to admit water thereto and prevent the return thereof, a dam between the low reservoir and the ocean having passages therethrough the bottoms of which are at low tide level, gates hinged to the tops of the last mentioned passages and adapted to swing away from the low reservoir to permit the water to flow therefrom and prevent the return thereto, a coffer dam between the high and low reservoirs and having passages therethrough and a plurality of wells therein, gates for closing the passages in the coffer dam, and power creating mechanism above said dam adapted to be actuated by the flow of water through the coffer dam passages when the gates are open and the reciprocation of members in said wells alternately actuated.

37. A system for utilizing the power of tides consisting of a high reservoir, a low reservoir adjacent thereto and at one side thereof, a dam between the high reservoir and the ocean having passages therethrough the bottoms of which are at the mean tide level and the tops of which are below high tide level, gates hinged to the tops of said passages and adapted to swing toward said high reservoir to admit water thereto and prevent the return thereof, a dam between the low reservoir and the ocean having passages therethrough, the bottoms of which are at low tide level, gates hinged to the tops of the last mentioned passages and adapted to swing away from the low reservoir to permit the water to flow therefrom and prevent the return thereof, a coffer dam between the high and low reservoirs and having a plurality of passages therethrough, gates for closing the entrance to said passages, a well associated with each passage, a float in each well, means for opening said coffer dam gates alternately to cause said floats to be alternately raised and then lowered, and power creating mechanism adapted to be actuated by the lowering of said floats.

38. A system for utilizing the power of tides consisting of a high reservoir, a low reservoir, means for automatically admitting water directly from the ocean to the high reservoir through a walled inlet in a dam between said high reservoir and ocean and maintaining it at a higher level than said inlet, means for automatically discharging the water from the low reservoir directly into the ocean during the ebb tide through an outlet in a dam between said low reservoir and the ocean, a coffer dam between the high and low reservoirs provided with a gate therethrough, and power creating mechanism adjacent said coffer dam adapted to be actuated by the flow of water through the coffer dam when said gate is open.

39. A system for utilizing the power of tides consisting of a high reservoir, a low reservoir, a dam between said high reservoir and the ocean having an inlet passage considerably below high tide level through which water may be admitted to the high reservoir, means preventing the return of water through said inlet passage, means for automatically discharging the water from the low reservoir during the ebb tide through an outlet in a dam between said low reservoir and the ocean, a coffer dam between the high and low reservoirs provided with a gate therethrough and having wells therein, and power creating mechanism adjacent said coffer dam adapted to be actuated by the alternate rise and fall of water in said wells when said gate is open.

Signed by me at 746 Old South Bldg., Boston, Mass., this 19th day of February, 1926.

JOHN A. KNOWLTON.